3,557,161
ESTROGEN WATER-SOLUBLE CONJUGATES
AND PREPARATION THEREOF
John Paul Dusza, Naunet, N.Y., Joseph Peter Joseph,
 Cliffside Park, N.J., and Seymour Bernstein, New City,
 N.Y., assignors to American Cyanamid Company,
 Stamford, Conn., a corporation of Maine
No Drawing. Filed Jan. 31, 1969, Ser. No. 795,698
Int. Cl. C07c *169/08*
U.S. Cl. 260—397.5          5 Claims

ABSTRACT OF THE DISCLOSURE

The preparation of novel 17-monoformyloxy- and 16,17-diformyloxy ring A aromatic steroids is described. They are useful as estrogenic agents and also as intermediates in the preparation of steroid glucopyranosiduronates and glycosides.

DESCRIPTION OF THE INVENTION

The present invention relates to new steroid compounds. More particularly, it relates to aromatic steroids and methods of preparing the same.

The novel steroids of this invention can be illustrated by the following formula:

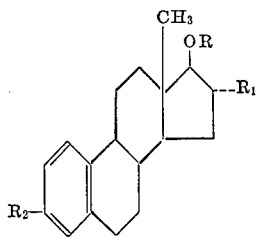

wherein R is selected from the group consisting of hydrogen and formyl; $R_1$ is selected from the group consisting of hydrogen, hydroxyl and formyloxy; $R_2$ is selected from the group consisting of hydroxyl and triethylammonium sulfate and with the provisos that when R is formyl then $R_1$ is hydrogen or formyloxy, and when $R_1$ is formyloxy, R is formyl.

The present compounds are crystalline solids and are relatively soluble in organic solvents such as methylene chloride, acetone, chloroform, and the like.

The compounds of the present invention having a formyloxy group in the 17-position or diformyloxy groups in the 16,17-positions are prepared by heating the corresponding ring A aromatic steroid having hydroxyl group in the 17 or 16,17-positions with formic acid. The reaction will take place without a catalyst; however a catalyst such as p-toluenesulfonic acid can be used with improved results. The reaction will take place at a temperature of from 40° C. to 120° C. The reaction will be complete in from a few minutes to several hours. The mono- or diformyloxysteroids can be recovered by methods well known to those skilled in the art.

The triethylammonium sulfate salts can be prepared from the mono or diformyloxy steroids by reaction with triethylamine-sulfur trioxide complex in an anhydrous solvent such as pyridine. The reaction will take place at a temperature within the range of from 10° to 100° C. over a period of from 30 minutes to 24 hours.

The formylated triethylammonium steroid sulfates can be hydrolyzed by heating with triethylamine in the presence of solvents such as alcohols. This unique hydrolysis method converts the mono- and diformyloxy-steroids into the corresponding mono- and dihydroxy-steroids without affecting the triethylammonium sulfate group present.

The compounds of the present invention are useful as estrogenic agents. The mono and diformyloxy steroids are additionally useful as intermediates in the preparation of steroid glucopyranosiduronates described and claimed in the copending application Ser. No. 795,699, filed Jan. 31, 1969, by co-workers.

DETAILED DESCRIPTION

The following examples describe in detail the preparation of representative compounds of this invention.

EXAMPLE 1

Preparation of estriol-16,17-diformate

A reaction mixture of estriol (0.10 g.), 88% formic acid (2 ml.) and p-toluenesulfonic acid (0.01 g.) is heated on a steam bath for 5 minutes and then allowed to stand overnight at room-temperature. A few drops of pyridine are added, and the entire reaction mixture is poured into water and filtered. The resultant solid is dissolved in methylene chloride and passed through a short pad of hydrous magnesium silicate. The solvent is evaporated to give crystals which are recrystallized twice to provide the 16,17-diformate (0.068 g.), melting point 177–178.5°, $[\alpha]_D^{25}$—22.7° (CHCl$_3$), $$\lambda_{max}^{methanol}$$

282 and 288 m$\mu$ ($\epsilon$ 2160 and 1890 respectively).

EXAMPLE 2

Preparation of triethylammonium estriol-3-sulfate

A solution of estriol-16,17-diformate (0.5 g.) and triethylamine-sulfur trioxide complex [0.29 g. (1.1 equiv.)] in dry pyridine (2.0 ml.) is allowed to stand overnight at room temperature. On pouring into anhydrous ether, an oil is obtained from which the solvent is decanted. The oil is dissolved in methylene chloride and passed through a short pad of hydrous magnesium silicate, and the resultant methylene chloride solution is evaporated to give 0.41 g. of triethylammonium estriol-16,17-diformyl-3-sulfate as a glass.

The glass is refluxed for 1 hour in a solution of methanol (10 ml.) and triethylamine (1.0 ml.), and then the entire reaction mixture is evaporated to give a crystalline residue (0.35 g.). Several recrystallizations from acetone-hexane gives the desired product (0.15 g.), melting point 137°–138° C., $[\alpha]_D^{25}$+28.1° (CHCl$_3$), $$\lambda_{max}^{methanol}$$

270 and 276 m$\mu$ ($\epsilon$ 1175 and 1010 respectively).

EXAMPLE 3

Preparation of 17$\beta$-estradiol-17-formate

To 15 ml. of 88% formic acid there is added 1.0 g. of 17$\beta$-estradiol. The solution is heated on a steam-bath for one hour and is evaporated under reduced pressure to provide a gum. Methylene chloride is added to the gum and then removed under reduced pressure several times and finally anhydrous ether is added to the residue whereupon the gum crystallized. The solid is collected and dried to give 1.0 g. of 17$\beta$-estradiol-17-formate. A sample is removed for recrystallization from methylene chloride-hexane, melting point 154–155° C.

EXAMPLE 4

Preparation of triethylammonium 17$\beta$-estradiol-3-sulfate

In 1 ml. of pyridine there is dissolved 400 mg. of 17$\beta$-estradiol-17-formate and 288 mg. of triethylamine-sulfur trioxide. The solution is allowed to remain overnight at room temperature, and is then poured into ether. The resulting gum, estradiol-3-triethylammonium sulfate-17-formate, did not readily crystallize, and is dissolved in 5.0 ml. of methanol and 0.5 ml. of triethylamine. The solution is refluxed for 5 hours and evaporated under reduced pressure to leave a gum (270 mg.) which crystallized on trituration with anhydrous ether. Recrystallization from methylene chloride-ether gives the desired compound, melting point 148°–150° C.

What is claimed is:

1. A steroid of the formula:

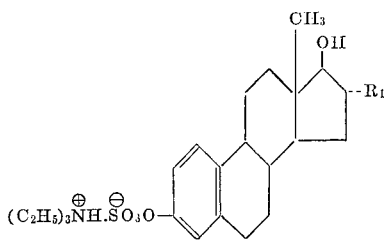

wherein $R_1$ is hydroxy.

2. The steroid in accordance with claim 1, triethylammonium estriol-3-sulfate.

3. A method of preparing a steroid of the formula:

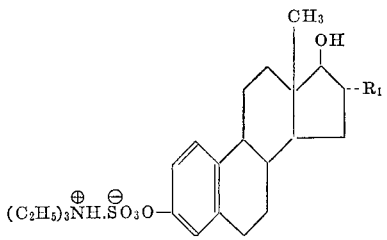

wherein $R_1$ is selected from the group consisting of hydrogen and hydroxyl which comprises heating a steroid of the formula:

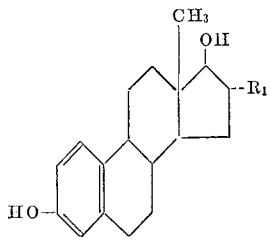

wherein $R_1$ is as defined above, with formic acid to produce the corresponding 16,17-diformyl or 17-formyl steroid, contacting the latter steroids with triethylamine-sulfur trioxide to produce the corresponding 3-triethylammonium sulfate salt, subsequently heating the latter compounds with triethylamine in a solvent to remove the formyl groups and recovering the corresponding 3-triethylammonium sulfate steroids therefrom.

4. A method in accordance with claim 3, in which the starting material is estriol.

5. A method in accordance with claim 3, in which the starting material is 17β-estradiol.

References Cited

UNITED STATES PATENTS

| | | | |
|---|---|---|---|
| 2,636,042 | 4/1953 | Salkin | 260—397.4 |
| 3,166,473 | 1/1965 | Mochida et al. | 167—58 |
| 3,449,383 | 6/1969 | Baran | 260—397.5 |

OTHER REFERENCES

Kereszty et al., Chem. Abstracts, vol. 47, 619d.

Djerassi, Steroid Reactions, 1963, page 81, Holden-Day, Inc., publishers.

LEWIS GOTTS, Primary Examiner

E. G. LOVE, Assistant Examiner

U.S. Cl. X.R.

260—999